(12) United States Patent
Han et al.

(10) Patent No.: US 12,735,329 B2
(45) Date of Patent: Sep. 15, 2026

(54) METHOD FOR PRODUCTION OF MOLYBDENUM DIOXIDE DICHLORIDE

(71) Applicants: WONIK MATERIALS CO., LTD., Cheongju-si (KR); Wonik Materials North America, LLC, Germantown, WI (US)

(72) Inventors: Seong Ho Han, Cheongju-si (KR); Andrey Korolev, Milwaukee, WI (US); Venkata Ramana Gandikota, Germantown, WI (US)

(73) Assignees: WONIK MATERIALS CO., LTD., Cheongju-si (KR); WONIK MATERIALS NORTH AMERICA, LLC, Germantown, WI (US)

( * ) Notice: Subject to any disclaimer, the term of this patent is extended or adjusted under 35 U.S.C. 154(b) by 44 days.

(21) Appl. No.: 18/998,434

(22) PCT Filed: Feb. 19, 2024

(86) PCT No.: PCT/KR2024/095391

§ 371 (c)(1), (2) Date: Jan. 24, 2025

(87) PCT Pub. No.: WO2025/159366

PCT Pub. Date: Jul. 31, 2025

(65) Prior Publication Data

US 2026/0008688 A1 Jan. 8, 2026

(30) Foreign Application Priority Data

Jan. 26, 2024 (KR) ........................ 10-2024-0011930

(51) Int. Cl.
*C01G 39/00* (2006.01)
*B01D 7/00* (2006.01)

(52) U.S. Cl.
CPC ............... *C01G 39/00* (2013.01); *B01D 7/00* (2013.01); *C01P 2006/80* (2013.01)

(58) Field of Classification Search
None
See application file for complete search history.

(56) References Cited

FOREIGN PATENT DOCUMENTS

| | | | | |
|---|---|---|---|---|
| KR | 10-2020-0127226 A | 11/2020 | | |
| KR | 10-2022-0124704 A | 9/2022 | | |
| KR | 10-2022-0131312 A | 9/2022 | | |
| KR | 10-2462376 B1 | 11/2022 | | |
| TW | 202227366 A | 7/2022 | | |
| WO | WO-2024085391 A1 * | 4/2024 | ............. | C01G 39/04 |

OTHER PUBLICATIONS

English translation of WO-2024085391-A1 Description. (Year: 2024).*

(Continued)

*Primary Examiner* — Anthony J Zimmer
*Assistant Examiner* — Zachary John Baum
(74) *Attorney, Agent, or Firm* — You & IP, LLC

(57) ABSTRACT

The present invention relates to a method for producing molybdenum dioxide dichloride, which is a very efficient method that does not use dangerous chlorine gas and high reaction temperature and is capable of obtaining molybdenum dioxide dichloride without solvent at a high yield.

7 Claims, 2 Drawing Sheets

(56) References Cited

OTHER PUBLICATIONS

English translation of KR-102462376-B1 Description. (Year: 2022).*
Taiwanese Office Action mailed on Aug. 18, 2025.
Herrmann, Wolfang A., "Synthetic Methods of Organometallic and Inorganic Chemistry", Transition Metals Part 3, 2009, 9, pp. 117.
International Search Report of PCT/KR2024/095391 mailed on Oct. 23, 2024.

* cited by examiner

| | Concentration in ppb | | | | | | |
|---|---|---|---|---|---|---|---|
| Elements | In house results | Reporting Limit | Specification | Elements | In house results | Reporting Limit | Specification |
| Aluminum (Al) | 227.10 | < 35 | < 1000 | Mercury (Hg) | < 35 | < 35 | < 1000 |
| Antimony (Sb) | <35 | < 35 | < 1000 | Molybdenum (Mo) | PC | < 35 | < 1000 |
| Arsenic (As) | < 35 | < 35 | < 1000 | Neodymium (Nd) | *INT | < 35 | < 1000 |
| Barium (Ba) | 148.80 | < 35 | < 1000 | Nickel (Ni) | < 35 | < 35 | < 1000 |
| Beryllium (Be) | < 35 | < 35 | < 1000 | Niobium (Nb) | *INT | < 35 | < 1000 |
| Bismuth (Bi) | < 35 | < 35 | < 1000 | Palladium (Pd) | *INT | < 35 | < 1000 |
| Boron (B) | < 35 | < 35 | < 1000 | Platinum (Pt) | < 35 | < 35 | < 1000 |
| Cadmium (Cd) | *INT | < 35 | < 1000 | Potassium (K) | 2380.00 | < 35 | < 1000 |
| Calcium (Ca) | < 35 | < 35 | < 1000 | Praseodymium (Pr) | *INT | < 35 | < 1000 |
| Chromium (Cr) | < 35 | < 35 | < 1000 | Rhenium (Re) | <35 | < 35 | < 1000 |
| Cobalt (Co) | < 35 | < 35 | < 1000 | Rhodium (Rh) | < 35 | < 35 | < 1000 |
| Copper (Cu) | < 35 | < 35 | < 1000 | Ruthenium (Ru) | < 35 | < 35 | < 1000 |
| Dysprosium (Dy) | *INT | < 35 | < 1000 | Samarium (Sm) | < 35 | < 35 | < 1000 |
| Erbium (Er) | *INT | < 35 | < 1000 | Silver (Ag) | < 35 | < 35 | < 1000 |
| Europium (Eu) | < 35 | < 35 | < 1000 | Sodium (Na) | < 35 | < 35 | < 1000 |
| Gadolinium (Gd) | *INT | < 35 | < 1000 | Strontium (Sr) | < 35 | < 35 | < 1000 |
| Gallium (Ga) | < 35 | < 35 | < 1000 | Tantalum (Ta) | < 35 | < 35 | < 1000 |
| Germanium (Ge) | < 35 | < 35 | < 1000 | Terbium (Tb) | 144.60 | < 35 | < 1000 |
| Gold (Au) | < 35 | < 35 | < 1000 | Tellurium (Te) | *INT | < 35 | < 1000 |
| Hafnium (Hf) | < 35 | < 35 | < 1000 | Thallium (Tl) | < 35 | < 35 | < 1000 |
| Holmium (Ho) | 343.20 | < 35 | < 1000 | Thulium (Tm) | < 35 | < 35 | < 1000 |
| Indium (In) | *INT | < 35 | < 1000 | Tin (Sn) | < 35 | < 35 | < 1000 |
| Iron (Fe) | 662.80 | < 35 | < 1000 | Titanium (Ti) | < 35 | < 35 | < 1000 |
| Lanthanum (La) | < 35 | < 35 | < 1000 | Tungsten (W) | < 35 | < 35 | < 1000 |
| Lead (Pb) | < 35 | < 35 | < 1000 | Vanadium (V) | < 35 | < 35 | < 1000 |
| Lithium (Li) | < 35 | < 35 | < 1000 | Ytterbium (Yb) | < 35 | < 35 | < 1000 |
| Lutetium (Lu) | < 35 | < 35 | < 1000 | Yttrium (Y) | < 35 | < 35 | < 1000 |
| Magnesium (Mg) | < 35 | < 35 | < 1000 | Zinc (Zn) | < 35 | < 35 | < 1000 |
| Manganese (Mn) | 99.68 | < 35 | < 1000 | Zirconium (Zr) | < 35 | < 35 | < 1000 |
| Positive hit Sum | 4006.18 | | | | | | |
| Purity (%): | 99.99959938 | 100- [sum of the positive hits/ 10,000,000] | | | | | |

FIG. 2

METHOD FOR PRODUCTION OF MOLYBDENUM DIOXIDE DICHLORIDE

TECHNICAL FIELD

The present invention relates to a method for producing molybdenum dioxide dichloride ($MoO_2Cl_2$). More specifically, the present invention relates to a method for synthesizing molybdenum dioxide dichloride in anhydrous and solvent-free form.

BACKGROUND ART

Molybdenum dioxide dichloride ($MoO_2Cl_2$) is a well-known molybdenum inorganic compound.

Recently, the molybdenum dioxide dichloride ($MoO_2Cl_2$) has attracted attention as a precursor for deposition (CVD or ALD) of metal molybdenum films using vacuum deposition technology in the semiconductor industry.

The molybdenum films deposited using the molybdenum dioxide dichloride ($MoO_2Cl_2$) generally show better performance than those deposited using organometallic molybdenum precursors. This is because the molybdenum dioxide dichloride ($MoO_2Cl_2$) does not contain nitrogen and carbon atoms, so the purity of the final film is higher.

Meanwhile, two general methods for synthesizing the molybdenum dioxide dichloride ($MoO_2Cl_2$) are to chlorinate molybdenum dioxide ($MoO_2$) and molybdenum trioxide ($MoO_3$), as shown in Reaction Formulas 1 and 2 below.

(Reaction Formula 1)

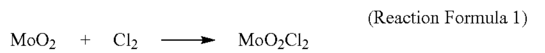

(Reaction Formula 2)

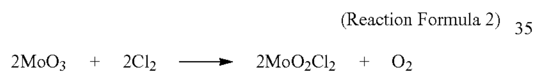

The above two methods of Reaction Formulas 1 and 2 are methods of passing an excess of chlorine gas through respective solid oxide layers of Reaction Formulas 1 and 2, i.e., molybdenum dioxide ($MoO_2$) and molybdenum trioxide ($MoO_3$), at a high temperature. This passage of chlorine gas is performed at 200° C. or higher for the molybdenum dioxide layer and at 900° C. or higher for the molybdenum trioxide layer.

The molybdenum dioxide dichloride ($MoO_2Cl_2$) produced by the passage of chlorine gas in Reaction Formulas 1 and 2 is separated and obtained by sublimation.

However, the above two producing methods according to Reaction Formulas 1 and 2 have the problems that i) the excess chlorine gas used in the producing method must be removed, and ii) the molybdenum dioxide dichloride ($MoO_2Cl_2$) obtained by sublimation is sublimated into a very light and fluffy solid, which takes up the acquisition space and has a high possibility of blocking the exhaust line.

To solve the above problems, another method for producing molybdenum dioxide dichloride ($MoO_2Cl_2$) is proposed, as shown in Reaction Formulas 3-1 and 3-2 below.

(Reaction Formula 3-1)

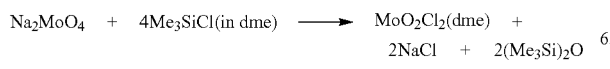

-continued (Reaction Formula 3-2)

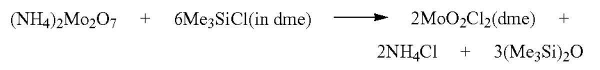

The producing methods according to Reaction Formulas 3-1 and 3-2 are to produce a molybdenum dioxide dichloride solvated adduct ($MoO_2Cl_2$(dme)), which is a 1,2-dimethoxyethane (dme) solvated form of molybdenum dioxide dichloride, by reacting sodium molybdenum dioxide dichloride ($Na_2MoO_4$) and ammonium molybdate ($(NH_4)_2Mo_2O_7$) with chlorotrimethylsilane dimethoxyethane ($Me_3SiCl$(in dme)), respectively.

The above two methods according to Reaction Formulas 3-1 and 3-2 can obtain pure molybdenum dioxide dichloride dimethoxyethane ($MoO_2Cl_2$(dme)) in high yield, and this product is widely used as an intermediate for the synthesis of many molybdenum compounds.

It is known that the solvent of the above solvated adduct can be removed using a general technique (e.g., heating under vacuum), but when the above molybdenum dioxide dichloride dimethoxyethane ($MoO_2Cl_2$(dme)) is heated above its melting point, molybdenum dioxide dichloride decomposes, making it impossible to obtain pure solvent-free molybdenum dioxide dichloride.

Yet another method for producing molybdenum dioxide dichloride ($MoO_2Cl_2$) is as shown in Reaction Formula 4 below.

(Reaction Formula 4)

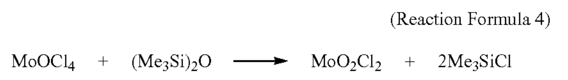

Molybdenum oxytetrachloride ($MoOCl_4$) in a perchlorinated form is converted into the desired molybdenum dioxide dichloride ($MoO_2Cl_2$) in a high yield through a reaction with hexamethyldisiloxane. However, molybdenum oxytetrachloride ($MoOCl_4$), the starting material in Reaction Formula 4, is not easily available.

As described above, there are many problems in the production of molybdenum dioxide dichloride ($MoO_2Cl_2$), and the development of a new method for producing molybdenum dioxide dichloride ($MoO_2Cl_2$) to improve these problems is urgent.

DISCLOSURE

Technical Problem

The present invention is intended to provide a method for producing molybdenum dioxide dichloride ($MoO_2Cl_2$) that provides various advantages while overcoming the disadvantages of the above-mentioned conventionally known production methods.

The present invention is also intended to achieve other objects that can be easily derived by a person skilled in the art from the above-mentioned clear object and the overall technology of this description.

Technical Solution

A method for producing molybdenum dioxide dichloride ($MoO_2Cl_2$) according to the present invention can be expressed as shown in Reaction Formula 5.

(Reaction Formula 5)

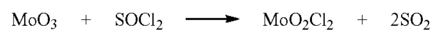

Specifically, the method for producing molybdenum dioxide dichloride ($MoO_2Cl_2$) according to the present invention includes:

i) a step of producing a mixture by mixing anhydrous molybdenum trioxide and thionyl chloride in a solvent under an inert gas (a first step of producing a mixture);

ii) a step of producing a solid product precipitated by refluxing and stirring the produced mixture with a temperature raised under an inert gas (a second step of producing a solid product); and iii) a step of separating and purifying molybdenum dioxide dichloride ($MoO_2Cl_2$) from the produced solid product (a third step of separating and purifying molybdenum dioxide dichloride ($MoO_2Cl_2$)).

In details of the above steps,

In the first step of producing a mixture, the usage ratio (in moles) of molybdenum trioxide to thionyl chloride may be 1:0.5 to 1:2.0.

The solvent in the first step of producing a mixture must be a non-coordinating solvent that should not react or coordinate with the product molybdenum dioxide dichloride ($MoO_2Cl_2$).

Specifically, the non-coordinating solvent may be an aliphatic and aromatic solvent containing a halogen element and having 2 or more carbon atoms.

The solvent may have a boiling point of 50° C. to 200° C.

The inert gas in the reaction vessel in the first step of producing a mixture and the second step of producing a solid product may be at least one of gases selected from the group consisting of nitrogen ($N_2$), argon (Ar), and helium (He).

In the second step of producing a solid product, the temperature rise for reflux stirring may be 50° C. to 200° C.

In the third step of separating and purifying molybdenum dioxide dichloride ($MoO_2Cl_2$), the separation is a step of filtering the produced solid product, washing it with the solvent of the first step of producing a mixture, and drying it in a vacuum to obtain molybdenum dioxide dichloride ($MoO_2Cl_2$).

The purification is performed by a method of sublimating the molybdenum dioxide dichloride ($MoO_2Cl_2$) obtained by the drying.

Advantageous Effects

As described above, the method for producing molybdenum dioxide dichloride ($MoO_2Cl_2$) according to the present invention has the advantages of being able to avoid dangerous chlorine gas and high reaction temperature, unlike the conventionally known technology, and obtaining molybdenum dioxide dichloride ($MoO_2Cl_2$) without solvent at a high yield.

In addition, the method for producing molybdenum dioxide dichloride ($MoO_2Cl_2$) according to the present invention has the advantages of being safe because it does not use dangerous chlorine gas and high reaction temperature, and thus is capable of mass production as well as small-scale production.

Furthermore, since molybdenum trioxide ($MoO_3$) and thionyl chloride ($SOCl_2$), which are easy to purchase and inexpensive, are used as reactants, there is an economic advantage in producing molybdenum dioxide dichloride ($MoO_2Cl_2$).

DESCRIPTION OF DRAWINGS

FIG. 2 is a graph showing the analysis results of ICP-MS (Inductively Coupled Plasma Mass Spectrometer) for sublimated molybdenum dioxide dichloride ($MoO_2Cl_2$) according to the present invention.

BEST MODE FOR CARRYING OUT THE INVENTION

Figure 1:
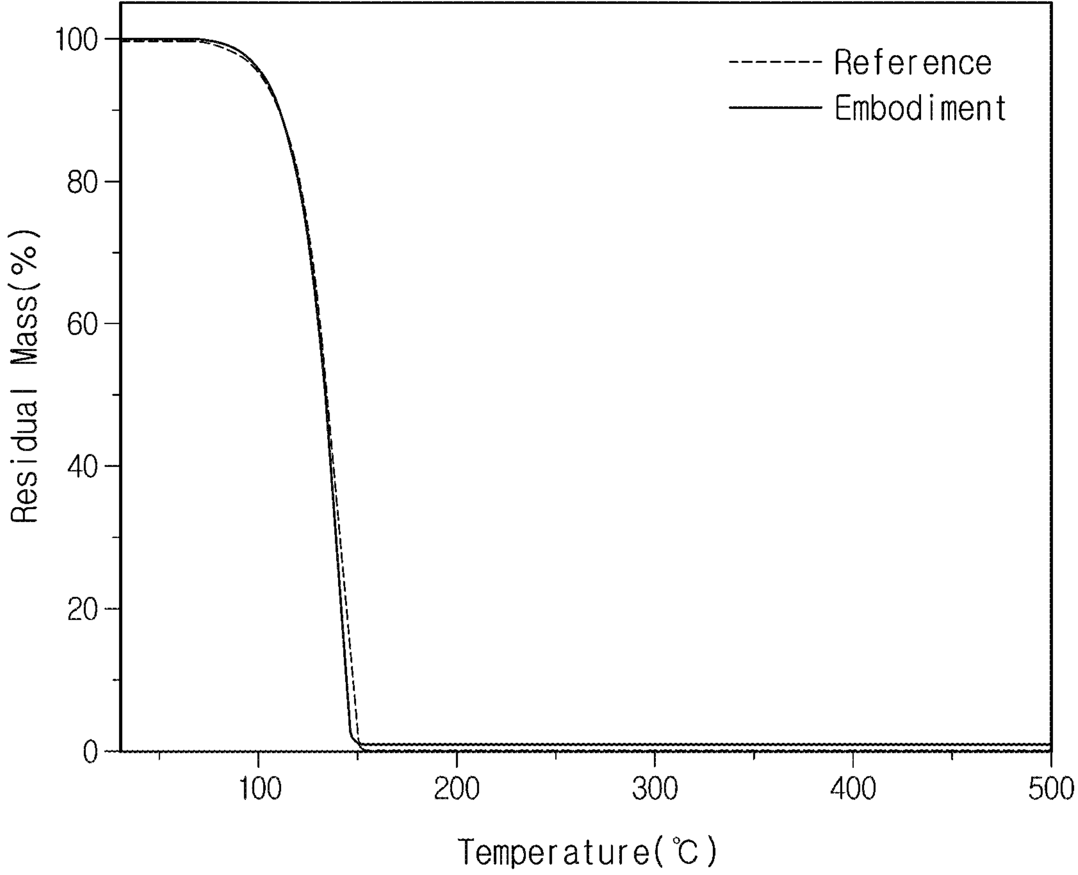
FIG. 1 is a graph showing the analysis results of TGA (Thermogravimetric Analyzer) for purified molybdenum dioxide dichloride ($MoO_2Cl_2$) obtained according to the first embodiment of the present invention (Embodiment 1) and molybdenum dioxide dichloride ($MoO_2Cl_2$) purchased from Sigma Aldrich (Reference).

Hereinafter, the present invention will be described in detail.

The following description is only an example of specific embodiments, and since the present invention can be variously modified and can have various forms, the present invention is not limited to the described specific embodiments. It should be understood that the present invention includes all modifications, equivalents, or substitutes included in the spirit and technical scope of the present invention.

In addition, many specific details, such as specific components, are described in the following description, but these are provided only to help a more general understanding of the present invention, and it will be obvious to a person skilled in the art that the present invention can be practiced without these specific details.

Also, in the description of the present invention, if it is determined that a detailed description of a related known function or component may unnecessarily obscure the subject matter of the present invention, the detailed description is omitted.

In addition, the terms used herein are only for describing specific embodiments and are not intended to limit the present invention. Unless otherwise defined, all terms used herein, including technical or scientific terms, have the same meaning as commonly understood by those of ordinary skill in the art to which the present invention belongs. Terms defined in commonly used dictionaries should be interpreted as having a meaning consistent with the meaning they have in the context of the relevant art, and shall not be interpreted in an idealized or overly formal sense unless explicitly defined in this application.

In the description, singular expressions also include plural expressions unless the context clearly indicates otherwise.

In the description, terms used to describe various components are not intended to limit the components. Such terms are used only for the purpose of distinguishing one component from another.

In the description, the terms "comprise", "include", "have", etc. are intended to specify the presence of features, elements (or components), etc. described herein, and do not mean that one or more other features or elements, etc. do not exist or cannot be added.

Hereinafter, the present invention will be described in detail.

A method for producing molybdenum dioxide dichloride ($MoO_2Cl_2$) according to the present invention can be expressed as shown in Reaction Formula 5.

(Reaction Formula 5)

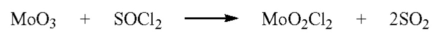

Specifically, the method for producing molybdenum dioxide dichloride ($MoO_2Cl_2$) according to the present invention includes:

i) a step of producing a mixture by mixing anhydrous molybdenum trioxide and thionyl chloride in a solvent under an inert gas (a first step of producing a mixture);

ii) a step of producing a solid product precipitated by refluxing and stirring the produced mixture with a temperature raised under an inert gas (a second step of producing a solid product); and iii) a step of separating and purifying molybdenum dioxide dichloride ($MoO_2Cl_2$) from the produced solid product (a third step of separating and purifying molybdenum dioxide dichloride ($MoO_2Cl_2$)).

In details of the above steps,

In the first step of producing a mixture, the usage ratio (in moles) of molybdenum trioxide to thionyl chloride may be 1:0.5 to 1:2.0, preferably from 1:0.8 to 1:1.5, and more preferably 1:1.

The solvent in the first step of producing a mixture must be a non-coordinating solvent that should not react or coordinate with the product molybdenum dioxide dichloride ($MoO_2Cl_2$).

Specifically, the non-coordinating solvent may be an aliphatic and aromatic solvent containing a halogen element and having 2 or more carbon atoms.

The solvent may have a boiling point of 50° C. to 200° C., preferably a boiling point of 70° C. to 120° C., and most preferably a boiling point of 80° C. to 100° C.

Specifically, the solvent may be at least one selected from the group consisting of tetrachloromethane ($CCl_4$), 1,2-dichloroethane ($C_2H_4Cl_2$), 1,1,1-trichloroethane, 1,1,2-trichloroethane ($C_2H_3Cl_3$), and chlorobenzene ($C_6H_5Cl$).

The inert gas in the reaction vessel in the first step of producing a mixture and the second step of producing a solid product may be at least one of gases selected from the group consisting of nitrogen ($N_2$), argon (Ar), and helium (He).

In the second step of producing a solid product, the temperature rise for reflux stirring may be 50° C. to 200° C., preferably 70° C. to 120° C., and more preferably 80° C. to 100° C. The reaction time of the reflux stirring may be 16 hours to 72 hours.

In the third step of separating and purifying molybdenum dioxide dichloride ($MoO_2Cl_2$), the separation is a step of filtering the produced solid product, washing it with the solvent of the first step of producing a mixture, and drying it in a vacuum to obtain molybdenum dioxide dichloride ($MoO_2Cl_2$).

The purification is performed by a method of sublimating the molybdenum dioxide dichloride ($MoO_2Cl_2$) obtained by the drying.

MODES FOR CARRYING OUT THE INVENTION

The present invention will be described more specifically through embodiments given below.

Embodiment 1

100 g (0.68 mol) of anhydrous molybdenum trioxide was added to a 1 L 4-necked flask equipped with a magnetic stirrer under an inert gas atmosphere. 500 ml of anhydrous 1,2-dichloroethane was added, and then 82 g (0.68 mol) of thionyl chloride was slowly added at room temperature to produce a mixture ($MoO_3$:$SOCl_2$=1:1 molar ratio).

The produced mixture was stirred using a magnetic stirrer to form a white suspension. The suspension was stirred under reflux for 24 hours in an inert gas atmosphere while increasing the temperature. At this time, a visible change in the formation of a precipitate occurred.

The produced yellow-brown mixture was filtered to obtain a yellow-brown solid product, which was washed with anhydrous 1,2-dichloroethane and dried under vacuum at room temperature to obtain 127 g of molybdenum dioxide dichloride ($MoO_2Cl_2$) (yield 97%).

The obtained product ($MoO_2Cl_2$) was purified by sublimation (90° C./180 mtorr) to obtain 121 g of a pale yellow solid product (yield 87%).

The obtained yellow solid product ($MoO_2Cl_2$) was analyzed using TGA analysis, and the TGA analysis result was identical to the analysis result of molybdenum dioxide dichloride ($MoO_2Cl_2$, CAS Number 13637-68-8) purchased from Sigma Aldrich. This result shows that the compound produced by the method for producing molybdenum dioxide dichloride according to the present invention is molybdenum dioxide dichloride (see FIG. 1).

The TGA analysis was performed using a Mettler Toledo TGA/DSC 3+, and the test material was heated to 500° C. at a rate of 10° C./min.

In addition, the obtained yellow solid product ($MoO_2Cl_2$) was shown to have a purity of 99.999% or higher through ICP-MS analysis (FIG. 2).

The ICP-MS analysis was performed using Thermo Scientific XSeries 2.

Embodiment 2

Except that 10 g (0.068 mol) of anhydrous molybdenum trioxide, 50 ml of anhydrous 1,2-dichloroethane, and 7.4 g (0.063 mol) of thionyl chloride were used (molar ratio of $MoO_3$:$SOCl_2$=1:0.9), 12 g of molybdenum dioxide dichloride ($MoO_2Cl_2$) was obtained (yield 87%). The obtained molybdenum dioxide dichloride ($MoO_2Cl_2$) was purified by sublimation in the same manner as in Embodiment 1, to obtain 11 g of a pale yellow solid product ($MoO_2Cl_2$) (yield 79%).

Embodiment 3

Except that 10 g (0.068 mol) of anhydrous molybdenum trioxide, 50 ml of anhydrous 1,2-dichloroethane, and 9.9 g (0.083 mol) of thionyl chloride were used (molar ratio of $MoO_3$:$SOCl_2$=1:1.2), 11 g of molybdenum dioxide dichloride ($MoO_2Cl_2$) was obtained (yield 82%). The obtained molybdenum dioxide dichloride ($MoO_2Cl_2$) was purified by sublimation in the same manner as in Embodiment 1, to obtain 9 g of a pale yellow solid product ($MoO_2Cl_2$) (yield 69%).

Embodiment 4

Synthesis was performed using the same method as Embodiment 1, and stirring under reflux was performed for 16 hours using 10 g (0.068 mol) of anhydrous molybdenum trioxide, 50 ml of anhydrous 1,2-dichloroethane, and 8.2 g (0.069 mol) of thionyl chloride. ($MoO_3$:$SOCl_2$=1:1) 10 g of molybdenum dioxide dichloride was obtained with a yield of 72% before purification, and 9 g of a pale yellow solid product was obtained with a yield of 68% after purification.

Embodiment 5

Synthesis was performed using the same method as Embodiment 1, and stirring was performed at 60° C. for 24 hours using 10 g (0.068 mol) of anhydrous molybdenum trioxide, 50 ml of anhydrous 1,2-dichloroethane, and 8.2 g (0.069 mol) of thionyl chloride. ($MoO_3$:$SOCl_2$=1:1) 10 g of molybdenum dioxide dichloride was obtained with a yield of 76% before purification, and 7 g of a pale yellow solid product was obtained with a yield of 49% after purification.

Comparative Example 1

Synthesis was performed using the same method as Embodiment 1, and stirring under reflux was performed for 24 hours using 10 g (0.068 mol) of anhydrous molybdenum trioxide, 50 ml of anhydrous heptane, and 8.2 g (0.069 mol) of thionyl chloride, but the desired molybdenum dioxide dichloride could not be obtained.

Comparative Example 2

Synthesis was performed using the same method as in Embodiment 1, and stirring under reflux was performed for 24 hours using 10 g (0.068 mol) of anhydrous molybdenum trioxide, 50 ml of anhydrous dichloromethane, and 8.2 g (0.069 mol) of thionyl chloride, but the desired molybdenum dioxide dichloride could not be obtained.

Comparative Example 3

Synthesis was performed using the same method as in Embodiment 1, and stirring under reflux was performed for 24 hours using 10 g (0.068 mol) of anhydrous molybdenum trioxide, 50 ml of anhydrous toluene, and 8.2 g (0.069 mol) of thionyl chloride, but the desired molybdenum dioxide dichloride could not be obtained.

Comparative Example 4

Synthesis was performed using the same method as in Embodiment 1, and stirring under reflux was performed for 24 hours using 10 g (0.068 mol) of anhydrous molybdenum trioxide, 50 ml of anhydrous 1,2-dichloroethane, and 16.4 g (0.136 mol) of thionyl chloride ($MoO_3$:$SOCl_2$=1:2 molar ratio), but the desired molybdenum dioxide dichloride could not be obtained.

Although the preferred embodiments of the present invention have been described above, the present invention is not limited to the specific embodiments described above, and those skilled in the art can make various modifications without departing from the subject matter of the present invention. Therefore, the scope of the present invention should not be interpreted as limited to the above embodiments, but should be determined not only by claims given below but also by equivalents of the claims.

INDUSTRIAL APPLICABILITY

As described above, the method for producing molybdenum dioxide dichloride ($MoO_2Cl_2$) according to the present invention is safe because chlorine gas and a high reaction temperature are not used, and thus not only small-scale production but also mass production is possible, making it very useful industrially.

The invention claimed is:

1. A method for producing molybdenum dioxide dichloride ($MoO_2Cl_2$), comprising:

i) a step of producing a mixture by mixing anhydrous molybdenum trioxide and thionyl chloride in a non-coordinating solvent under an inert gas (a first step of producing a mixture);

ii) a step of producing a solid product precipitated by refluxing and stirring the produced mixture with a temperature raised under an inert gas (a second step of producing a solid product); and iii) a step of separating and purifying molybdenum dioxide dichloride ($MoO_2Cl_2$) from the produced solid product (a third step of separating and purifying molybdenum dioxide dichloride ($MoO_2Cl_2$)), wherein the non-coordinating solvent is an aliphatic or aromatic solvent having 2 or more carbon atoms and containing a halogen element, the non-coordinating solvent having a boiling point of 50° C. to 200° C., and wherein in the first step of producing a mixture, a usage ratio (in moles) of molybdenum trioxide to thionyl chloride is 1:0.8 to 1:1.5.

2. The method of claim 1, wherein the non-coordinating solvent is at least one non-coordinating solvent selected from the group consisting of 1,2-dichloroethane ($C_2H_4Cl_2$), 1,1,1-trichloroethane, 1,1,2-trichloroethane ($C_2H_3Cl_3$), and chlorobenzene ($C_6H_5Cl$).

3. The method of claim 1, wherein in the first step of producing a mixture, a usage ratio (in moles) of molybdenum trioxide to thionyl chloride is 1:1.

4. The method of claim 1, wherein in the second step of producing a solid product, reflux stirring is performed at a temperature of 50° C. to 200° C.

5. The method of claim 1, wherein the inert gas in a reaction vessel in the first step of producing a mixture and the second step of producing a solid product is at least one of gases selected from the group consisting of nitrogen ($N_2$), argon (Ar), and helium (He).

6. The method of claim 1, wherein a reaction time of the reflux stirring is 16 hours to 72 hours.

7. The method of claim 1, wherein in the third step of separating and purifying molybdenum dioxide dichloride ($MoO_2Cl_2$), the purification is a sublimation method.

* * * * *